US010416699B2

(12) United States Patent
Shinozaki

(10) Patent No.: US 10,416,699 B2
(45) Date of Patent: Sep. 17, 2019

(54) AUTOMATED IDENTIFICATION OF AVAILABLE OPERATIONS FOR EQUIPMENT

(71) Applicant: KYOCERA Corporation, Kyoto-shi, Kyoto (JP)

(72) Inventor: Takayuki Shinozaki, Tokyo (JP)

(73) Assignee: KYOCERA Corporation, Kyoto (JP)

(*) Notice: Subject to any disclaimer, the term of this patent is extended or adjusted under 35 U.S.C. 154(b) by 258 days.

(21) Appl. No.: 15/039,749

(22) PCT Filed: Nov. 27, 2014

(86) PCT No.: PCT/JP2014/081358
§ 371 (c)(1),
(2) Date: May 26, 2016

(87) PCT Pub. No.: WO2015/080197
PCT Pub. Date: Jun. 4, 2015

(65) Prior Publication Data
US 2016/0378126 A1    Dec. 29, 2016

(30) Foreign Application Priority Data

Nov. 27, 2013    (JP) .................. 2013-244579

(51) Int. Cl.
*G05F 1/66*    (2006.01)
*G05B 15/02*    (2006.01)
(Continued)

(52) U.S. Cl.
CPC .............. *G05F 1/66* (2013.01); *F24F 1/0007* (2013.01); *G05B 15/02* (2013.01); *G08C 17/02* (2013.01); *G08C 2201/93* (2013.01)

(58) Field of Classification Search
CPC . G05F 1/66; F24F 1/007; G05B 15/02; G08C 17/02; G08C 2201/93
(Continued)

(56) References Cited

U.S. PATENT DOCUMENTS

2011/0074545 A1    3/2011    Yamada et al.
2013/0332706 A1    12/2013    Tanaka

FOREIGN PATENT DOCUMENTS

EP        1 087 355 A2    3/2001
JP        2001-094675 A   4/2001
(Continued)

OTHER PUBLICATIONS

Office Action dated Jan. 30, 2018 issued in counterpart Japanese Application No. 2015-550985.
(Continued)

*Primary Examiner* — Gene N Auduong
(74) *Attorney, Agent, or Firm* — Procopio Cory Hargreaves and Savitch LLP

(57) ABSTRACT

An operation terminal operates an operation target equipment. The operation terminal comprises: a display unit configured to display an operation screen for the operation target equipment; a communication unit configured to perform communication; and a control unit configured to control to transmit, by using the communication unit, at least one operation instruction from among candidates of available operations for the operation target equipment. The control unit controls a display object included in the operation screen, on the basis of a result of the operation instruction.

13 Claims, 8 Drawing Sheets

(51) Int. Cl.
G08C 17/02 (2006.01)
F24F 1/0007 (2019.01)

(58) Field of Classification Search
USPC .......................................... 700/83
See application file for complete search history.

(56) References Cited

FOREIGN PATENT DOCUMENTS

| | | |
|---|---|---|
| JP | 2002-374584 A | 12/2002 |
| JP | 2006-94406 A | 4/2006 |
| JP | 2006-295390 A | 10/2006 |
| JP | 2009-3724 A | 1/2009 |
| JP | 2011-077671 A | 4/2011 |
| JP | 2012-256319 A | 12/2012 |

OTHER PUBLICATIONS

International Search Report dated Jan. 6, 2015 by the Japanese Patent Office for International Application No. PCT/JP2014/081358.

Written Opinion of the International Searching Authority dated Dec. 19, 2014 issued by the Japanese Patent Office for International Application No. PCT/JP2014/081358.

FIG. 3

|   | PROPERTY NAME | SET | GET |
|---|---|---|---|
| 1 | OPERATION STATE | ○ | ○ |
| 2 | OPERATION MODE SETTING | ○ | ○ |
| 3 | RAPID OPERATION MODE SETTING | ○ | ○ |
| 4 | TEMPERATURE SETTING VALUE | ○ | ○ |
| 5 | RELATIVE HUMIDITY SETTING VALUE FOR DEHUMIDIFYING MODE | ○ | ○ |
| 6 | ROOM RELATIVE HUMIDITY MEASUREMENT VALUE | – | ○ |
| 7 | ROOM TEMPERATURE MEASUREMENT VALUE | – | ○ |
| 8 | EXTERNAL AIR TEMPERATURE MEASUREMENT VALUE | – | ○ |
| 9 | AIR FLOW SETTING | ○ | ○ |
| 10 | WIND DIRECTION SWING SETTING | ○ | ○ |
| 11 | ON TIMER RESERVATION SETTING | ○ | ○ |
| 12 | ON TIMER RELATIVE TIME SETTING VALUE | ○ | ○ |
| 13 | OFF TIMER RESERVATION SETTING | ○ | ○ |
| 14 | OFF TIMER RELATIVE TIME SETTING VALUE | ○ | ○ |

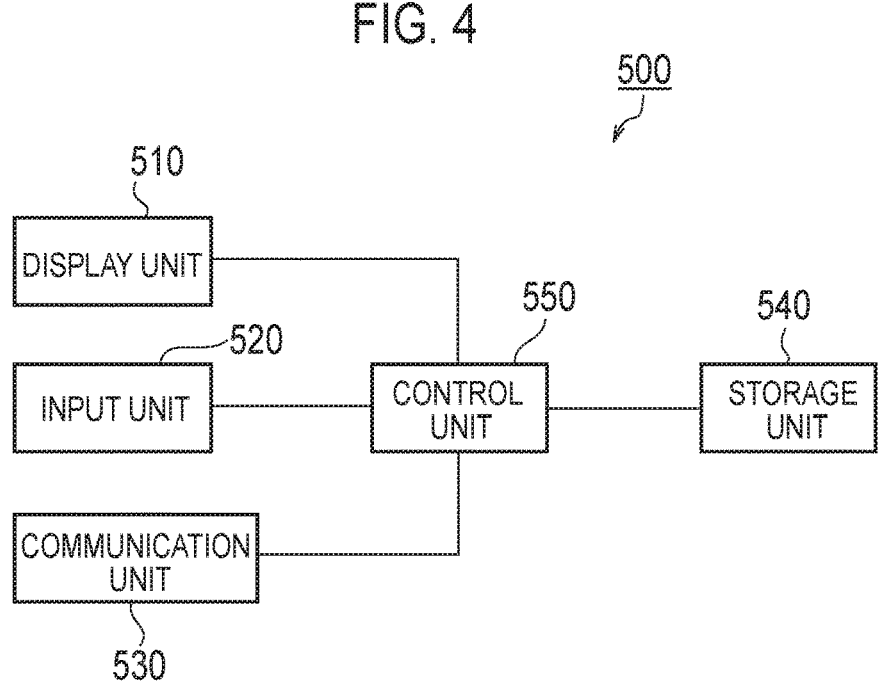

OPERATION CANDIDATE LIST

| OPERATION MODE | AUTOMATIC<br>COOLING<br>HEATING<br>DEHUMIDIFYING<br>AIR BLOW |
|---|---|
| TEMPERATURE SETTING VALUE | 10 DEGREES CELSIUS TO 50 DEGREES CELSIUS |
| AIR BLOW SETTING | AUTOMATIC<br>1<br>2<br>3<br>4<br>5<br>6<br>7<br>8 |
| WIND DIRECTION SWING SETTING | OFF=0x31<br>UPPER AND LOWER DIRECTIONS=0x41<br>RIGHT AND LEFT DIRECTIONS=0x42<br>UPPER, LOWER, RIGHT, AND LEFT DIRECTIONS=0x43 |

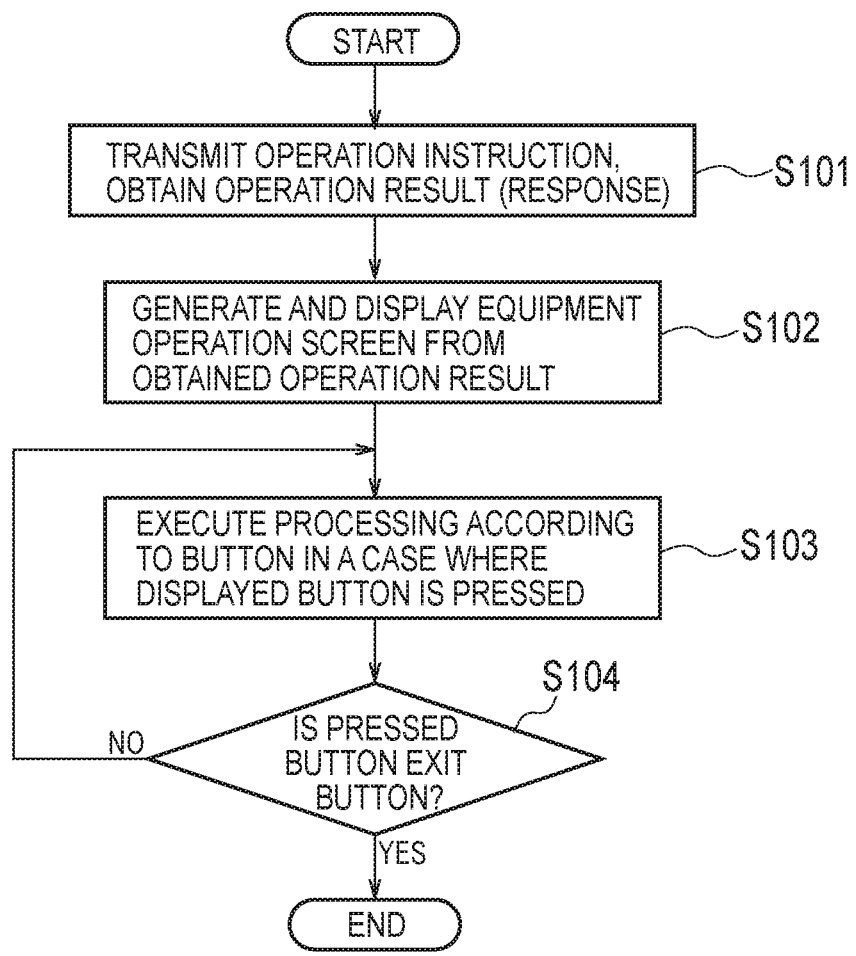

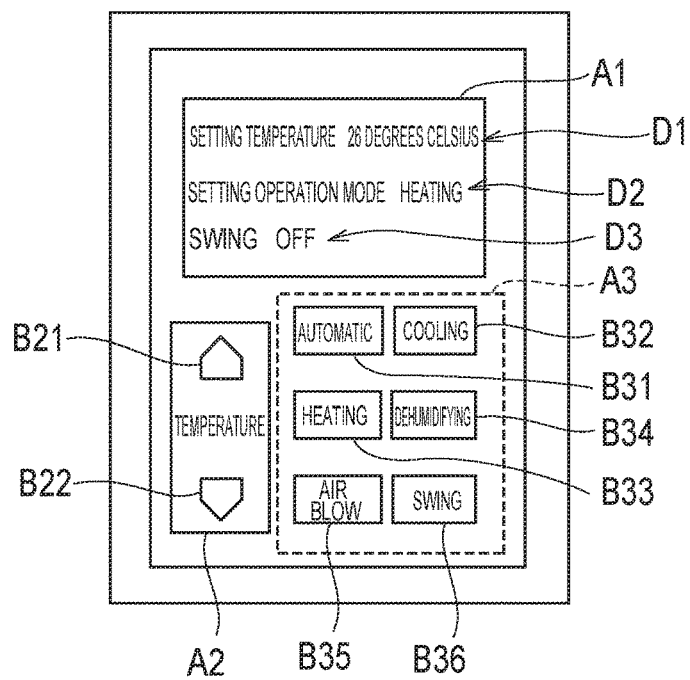
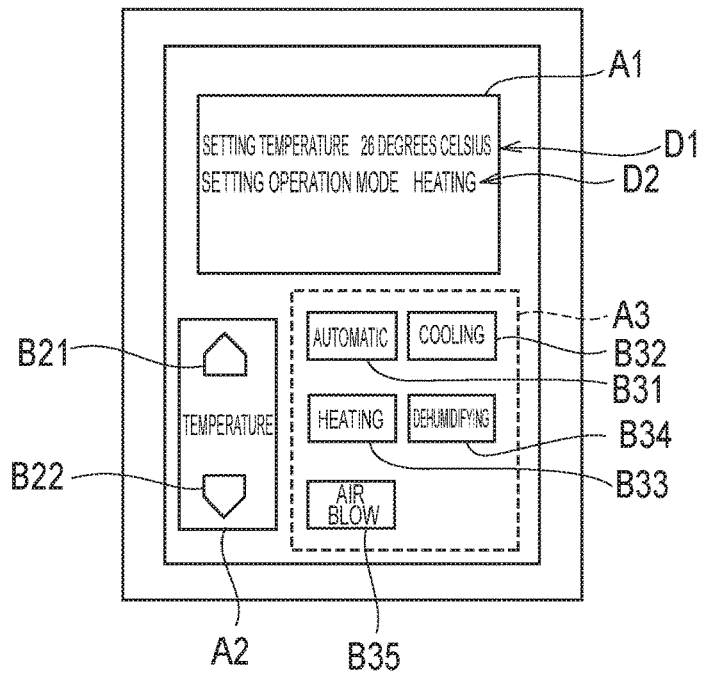

FIG. 9

OPERATION LIST TABLE

|  |  | OTHERS | A CORPORATION | B CORPORATION | PRODUCT Y OF C CORPORATION | PRODUCT X OF C CORPORATION |
|---|---|---|---|---|---|---|
| EQUIPMENT IDENTIFICATION CODE | MANUFACTURER CODE (KEY) | UNDEFINED | 1111 | 2222 | 3333 | 3333 |
|  | PRODUCT CODE (KEY) | UNDEFINED | UNDEFINED | UNDEFINED | AAAA | BBBB |
| SPECIFICATION INFORMATION | OPERATION MODE | AUTOMATIC COOLING HEATING DEHUMIDIFYING AIR BLOW | AUTOMATIC COOLING HEATING DEHUMIDIFYING AIR BLOW | COOLING HEATING DEHUMIDIFYING AIR BLOW | COOLING HEATING DEHUMIDIFYING AIR BLOW | COOLING HEATING |
|  | TEMPERATURE SETTING VALUE | 0 DEGREES CELSIUS TO 50 DEGREES CELSIUS | 12 DEGREES CELSIUS TO 40 DEGREES CELSIUS | 16 DEGREES CELSIUS TO 30 DEGREES CELSIUS | 16 DEGREES CELSIUS TO 30 DEGREES CELSIUS | 16 DEGREES CELSIUS TO 30 DEGREES CELSIUS |
|  | AIR BLOW SETTING | AUTOMATIC 1 2 3 4 5 6 7 8 | AUTOMATIC 1 2 3 4 5 6 7 8 | 1 2 3 4 5 | 1 2 3 | 1 2 3 |
|  | WIND DIRECTION SWING SETTING | OFF=0x31 UPPER AND LOWER DIRECTIONS=0x41 RIGHT AND LEFT DIRECTIONS=0x42 UPPER, LOWER, RIGHT, AND LEFT DIRECTIONS =0x43 | OFF=0x31 UPPER AND LOWER DIRECTIONS=0x41 RIGHT AND LEFT DIRECTIONS=0x42 UPPER, LOWER, RIGHT, AND LEFT DIRECTIONS =0x43 | OFF=0x31 UPPER AND LOWER DIRECTIONS=0x41 RIGHT AND LEFT DIRECTIONS=0x42 UPPER, LOWER, RIGHT, AND LEFT DIRECTIONS =0x43 | OFF=0x31 UPPER AND LOWER DIRECTIONS=0x41 | NOT SUPPORTED |

AUTOMATED IDENTIFICATION OF AVAILABLE OPERATIONS FOR EQUIPMENT

TECHNICAL FIELD

The present invention relates to an operation terminal, a program, and a method for operating an operation target equipment.

BACKGROUND ART

In recent years, a control system (EMS: Energy Management System) controlling multiple equipments provided in consumer's facilities of electric power has attracted attentions. A control device for controlling multiple equipments is provided in such control system.

A technique for transmitting an operation instruction for an operation target equipment from an operation terminal via a network to a control device and allowing the control device to control the operation target equipment on the basis of an operation instruction in order to operate an equipment by using the operation terminal possessed by a user has been suggested (for example, see Patent Literature 1).

By the way, available operations for an equipment are different in accordance with the specification and operation situation of the equipment.

However, in the technique for operating the equipment by using the operation terminal as described above, a user may select an unavailable operation that cannot be used with the operation target equipment, and therefore, an operation inappropriate for the operation target equipment may be performed.

CITATION LIST

Patent Literature

Patent Literature 1: Japanese application publication No. 2002-374584

SUMMARY OF INVENTION

An operation terminal according to a first aspect operates an operation target equipment. The operation terminal comprises: a display unit configured to display an operation screen for the operation target equipment; a communication unit configured to perform communication; and a control unit configured to control to transmit, by using the communication unit, at least one operation instruction from among candidates of available operations for the operation target equipment. The control unit controls a display object included in the operation screen, on the basis of a result of the operation instruction.

A program according to a second aspect causes an operation terminal including a display unit displaying an operation screen for the operation target equipment and a communication unit performing communication, and operating the operation target equipment to execute: a step of causing the communication unit to transmit at least one operation instruction from among candidates of available operations for the operation target equipment; and a step of controlling a display object included in the operation screen, on the basis of a result of the operation instruction.

A method according to a third aspect is used in an operation terminal including a display unit displaying an operation screen for the operation target equipment and a communication unit performing communication, and operating the operation target equipment. The method comprises: a step of causing the communication unit to transmit at least one operation instruction from among candidates of available operations for the operation target equipment; and a step of controlling a display object included in the operation screen, on the basis of a result of the operation instruction.

BRIEF DESCRIPTION OF DRAWINGS

FIG. 3 is a figure illustrating properties of an operation target equipment according to the embodiment.

FIG. 4 is a block diagram illustrating a configuration of an operation terminal according to the embodiment.

FIG. 5 is a figure illustrating an operation candidate list according to the embodiment.

FIG. 6 is a flow diagram illustrating an operation of an operation terminal according to the embodiment.

FIG. 7 is a figure illustrating a configuration example of an operation screen according to the embodiment (part 1).

FIG. 8 is a figure illustrating the configuration example of the operation screen according to the embodiment (part 2).

FIG. 9 is a figure illustrating an operation list table according to a second modification of the embodiment.

DESCRIPTION OF EMBODIMENTS

[Overview of Embodiment]

Figure 1:
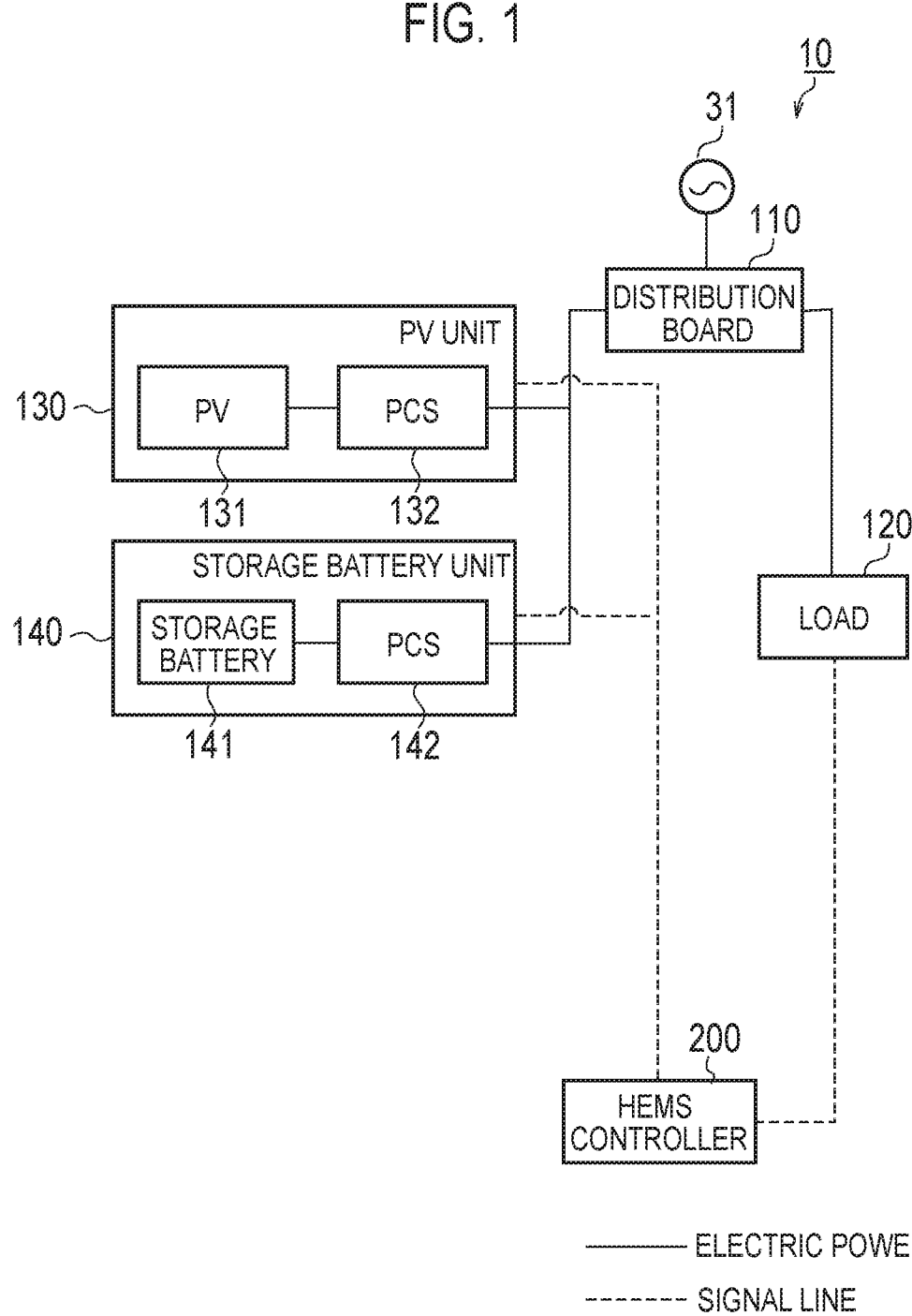
FIG. 1 is a block diagram illustrating a consumer's facility according to an embodiment.

An operation terminal according to the embodiment operates an operation target equipment. The operation terminal comprises: a display unit configured to display an operation screen for the operation target equipment; a communication unit configured to perform communication; and a control unit configured to control to transmit, by using the communication unit, at least one operation instruction from among candidates of available operations for the operation target equipment. The control unit controls a display object included in the operation screen, on the basis of a result of the operation instruction.

In the embodiment, the control unit performs control to identify the available operation from the candidates on the basis of the result of the operation instruction, and display a first display object associated with the available operation.

In the embodiment, in a case where the control unit detects a user input for selecting the first display object, the control unit performs control to transmit, via the network, an operation instruction for instructing an operation associated with the selected first display object.

In the embodiment, in the operation screen, a second display object associated with an unavailable operation for the operation target equipment is excluded from the candidates.

In a first modification the embodiment, the operation screen includes, among the candidates, a second display object associated with an unavailable operation for the operation target equipment. In a case where the control unit detects a user input for selecting the first display object, the control unit performs control to reflects the user input in the first display object, in a case where the control unit detects a user input for selecting the second display object, the control unit performs control so as not to reflect the user input in the second display object, or so as to display an error.

In the embodiment, the candidates are operations required to be displayed in all the operations defined for an equipment type to which the operation target equipment belongs.

In a second modification the embodiment, the operation terminal comprises a storage unit configured to store specification information about an available operation in association with an equipment identification code for each of a plurality of equipments. The control unit obtains an equipment identification code which is information about the operation target equipment via the network, and determines the candidate on the basis of the specification information associated with the obtained equipment identification code.

In a second modification the embodiment, each of the plurality of equipments belongs to a same equipment type as an equipment type to which the operation target equipment belongs. The equipment identification code includes at least one of a manufacturer code indicating a manufacturer of an equipment, a product code indicating a product name of the equipment, and an area code indicating an area where the equipment is to be used.

A program according to the embodiment causes an operation terminal including a display unit displaying an operation screen for the operation target equipment and a communication unit performing communication, and operating the operation target equipment to execute: a step of causing the communication unit to transmit at least one operation instruction from among candidates of available operations for the operation target equipment; and a step of controlling a display object included in the operation screen, on the basis of a result of the operation instruction.

A method according to the embodiment is used in an operation terminal including a display unit displaying an operation screen for the operation target equipment and a communication unit performing communication, and operating the operation target equipment. The method comprises: a step of causing the communication unit to transmit at least one operation instruction from among candidates of available operations for the operation target equipment; and a step of controlling a display object included in the operation screen, on the basis of a result of the operation instruction.

[Embodiment]
(Consumer's Facility)

Hereinafter, a consumer's facility according to an embodiment will be explained. FIG. 1 is a figure illustrating a consumer's facility 10 according to the embodiment.

As illustrated in FIG. 1, the consumer's facility 10 includes a distribution board 110, a load 120, a PV unit 130, a storage battery unit 140, and an HEMS controller 200.

The distribution board 110 is connected to an electricity distribution line 31 (power grid). The distribution board 110 is connected via an electric power line to a load 120, a PV unit 130, and a storage battery unit 140. The distribution board 110 may have a measurement unit measuring the electric power provided from the electricity distribution line 31.

The load 120 is an equipment that consumes the electric power provided via the electric power line. For example, the load 120 may be a refrigerator, a lighting fixture, an air conditioner, a television set, or the like. The load 120 may be a single equipment, or may include multiple equipments.

The PV unit 130 is an equipment for generating electric power, and includes a PV 131 and a PCS 132. The PV 131 is a type of distributed power supplies, and the PV 131 generates electric power by receiving light from the sun, and outputs the generated DC electric power. The PCS 132 converts the DC electric power that is output from the PV 131 into an AC electric power, and outputs the AC electric power via the electric power line.

The storage battery unit 140 is an equipment for accumulating electric power, and the storage battery unit 140 includes a storage battery 141 and a PCS 142. The storage battery 141 accumulates (charges) the electric power and outputs (discharges) the electric power. When the storage battery 141 is charged, the PCS 142 converts the AC electric power received via the electric power line into a DC electric power, and outputs the DC electric power to the storage battery 141. When the storage battery 141 is discharged, the PCS 142 converts the DC electric power that is output from the storage battery 141 into an AC electric power, and outputs the AC electric power via the electric power line.

The HEMS controller 200 is a control device for controlling multiple equipments provided in the consumer's facility 10 (the load 120, the PV unit 130, and the storage battery unit 140). The HEMS controller 200 controls, via a signal line, the load 120, the PV unit 130, and the storage battery unit 140. The signal line may be wirelessly connected or may be a wired line.

(Application Scene)

Figure 2:
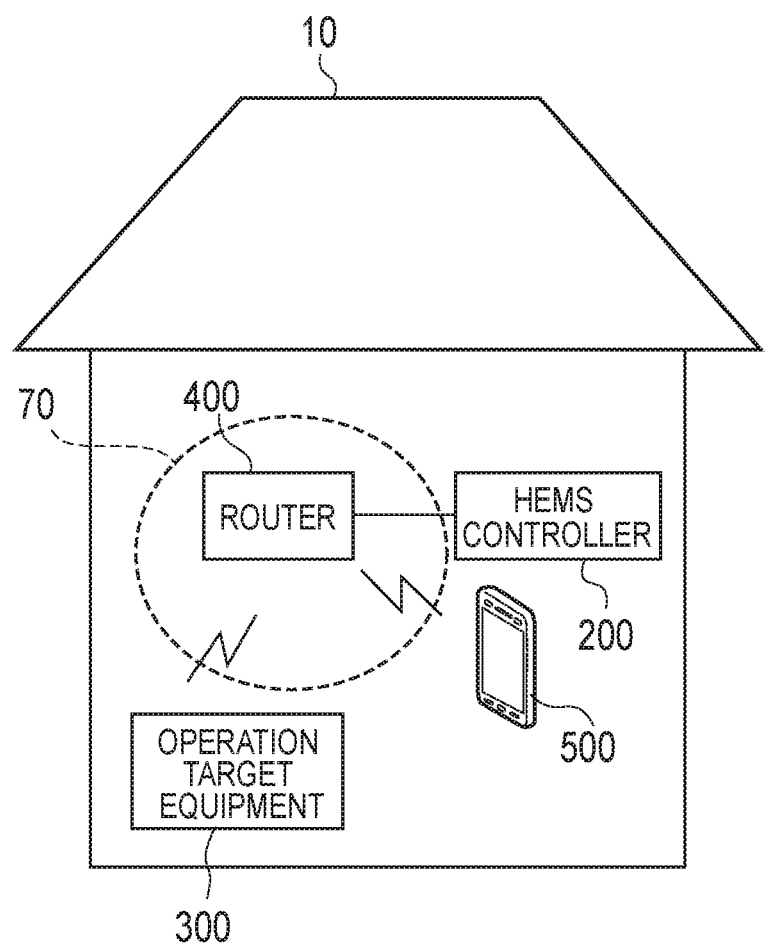
FIG. 2 is a figure illustrating an application scene of a control system according to the embodiment.

An application scene in which the control system according to the embodiment is applied will be hereinafter explained. FIG. 2 is a figure illustrating an application scene in which the control system according to the embodiment is applied.

As illustrated in FIG. 2, the control system according to the embodiment includes a local area network 70, an HEMS controller 200, an operation target equipment 300, and an operation terminal 500.

The local area network 70 is a network provided in the consumer's facility 10. The local area network 70 may be a wireless LAN, or may be a wired LAN. The local area network 70 includes a router 400. FIG. 2 illustrates an example of a case where the HEMS controller 200 and the router 400 are connected by a wire, the operation target equipment 300, the operation terminal 500, and the router 400 are connected wirelessly. Alternatively, the HEMS controller 200 and the router 400 may be connected wirelessly, and the operation target equipment 300, the operation terminal 500, and the router 400 may be connected by a wire.

The HEMS controller 200 communicates with the operation target equipment 300 and the operation terminal 500 via the local area network 70. The HEMS controller 200 receives an operation instruction for the operation target equipment 300 from the operation terminal 500, the HEMS controller 200 transmits the operation instruction to the operation target equipment 300.

The operation target equipment 300 communicates via the local area network 70 with the HEMS controller 200. The operation target equipment 300 is the load 120, the PV unit 130, or the storage battery unit 140. The operation target equipment 300 receives an operation instruction from the HEMS controller 200. In a case where the operation target equipment 300 accepts the received operation instruction, the operation target equipment 300 performs operation in accordance with the received operation instruction. In a case where the operation target equipment 300 accepts the received operation instruction, the operation target equipment 300 transmits, to the HEMS controller 200, a response in reply to the received operation instruction. In a case where the operation target equipment 300 does not accept the received operation instruction, the operation target equipment 300 transmits, to the HEMS controller 200, a negative response in reply to the received operation instruction.

The operation terminal 500 communicates via the local area network 70 with the HEMS controller 200. The operation terminal 500 is a portable terminal that performs radio communication (for example, a smartphone, a tablet terminal, or the like). Alternatively, the operation terminal 500 may be a personal computer communicating via a wire or may be a television set having a browser and the like. The operation terminal 500 transmits, to the HEMS controller 200, an operation instruction in reply to the operation target equipment 300. The operation terminal 500 receives, from the HEMS controller 200, a response or a negative response in reply to the operation instruction.

Alternatively, instead of communicating with the HEMS controller 200, the operation terminal 500 may directly perform communication with the operation target equipment 300. In this case, the operation terminal 500 transmits the operation instruction to the operation target equipment 300 without relying on the HEMS controller 200. The operation terminal 500 receives, from the operation target equipment 300, a response or a negative response in reply to the operation instruction without relying on the HEMS controller 200.

In the embodiment, messages (an operation instruction, a response, and a negative response) transmitted and received via the local area network 70 are messages based on ECHONET Lite (registered trademark) specification. In the ECHONET Lite (registered trademark) specification, a "class" is defined for each type of an equipment, and a control target and setting information in the equipment are defined as a "property" for each class.

FIG. 3 is a figure illustrating properties of the operation target equipment 300 according to the embodiment. In this case, an air conditioner, which is a type of loads 120, is considered as an operation target equipment 300. The air conditioner belongs to "household air conditioner class" in the ECHONET Lite (registered trademark) specification.

As illustrated in FIG. 3, in the household air conditioner class, multiple properties are defined. For example, the operation mode property indicates automatic, cooling, heating, dehumidifying, or air blow. The temperature setting value property indicates a temperature setting value in a range from 0 degrees Celsius to 50 degrees Celsius. The air flow setting property indicates an air flow level (any one of eight levels) or an air flow automation state. The wind direction swing setting property indicates wind direction swing OFF, upper and lower directions, right and left directions, or upper, lower, right, and left directions.

In each property, an access rule is defined. The access rule is whether "Set", i.e., a property value write request, can be performed or not, and whether "Get", i.e., a property value read request, can be performed or not.

For example, the operation mode property accepts both of Set and Get. Therefore, when a Set message (operation instruction) designating an operation mode is transmitted to the operation target equipment 300, the designated operation mode can be set in the operation target equipment 300 if the operation target equipment 300 supports the designated operation mode. When a Get message (operation instruction) for the operation mode property is transmitted to the operation target equipment 300, the operation mode that is set in the operation target equipment 300 can be obtained.

However, when the operation mode is designated by the Set message (operation instruction) but the designated operation mode is not supported by the operation target equipment 300, the operation target equipment 300 does not accept the Set message, and transmits a Set negative response message.

(Configuration of Operation Terminal)

Hereinafter, a configuration of the operation terminal 500 according to the embodiment will be explained. FIG. 4 is a block diagram illustrating the configuration of the operation terminal 500.

As illustrated in FIG. 4, the operation terminal 500 includes a display unit 510, an input unit 520, a communication unit 530, a storage unit 540, and a control unit 550.

The display unit 510 displays various kinds of images on the basis of an image signal received from the control unit 550. In the embodiment, the display unit 510 displays an operation screen of the operation target equipment 300.

The input unit 520 detects a user input, and outputs a signal indicating a content of the user input to the control unit 550. The input unit 520 may be integrally made with the display unit 510 (a so-called touch panel display).

The communication unit 530 performs communication via the local area network 70 (for example, wireless LAN communication or wired LAN communication). The communication unit 530 receives a communication signal, and outputs the received communication signal to the control unit 530. The communication unit 530 transmits a communication signal received from the control unit 550. Although the details will be explained later, the communication unit 530 may perform communication via a public network such as a portable telephone network and the like.

The storage unit 540 stores various kinds of information used for control in the control unit 550. The storage unit 540 stores programs executed by the control unit 550 (for example, application software and the like). Further, the storage unit 540 stores an operation candidate list explained later.

The control unit 550 performs various kinds of controls in the operation terminal 500 by executing programs stored in the storage unit 540. The details of the control of the control unit 550 will be explained later.

FIG. 5 is a figure illustrating an operation candidate list according to the embodiment. The operation candidate list is stored in the storage unit 540. The operation candidate list is a list illustrating candidates of available operations for the operation target equipment 300.

As illustrated in FIG. 5, the operation candidate list is a list of all the operations that are defined for an equipment type (class) to which the operation target equipment 300 belongs and that are required to be displayed. In a case where the operation target equipment 300 is an air conditioner, the operation candidate list is a list of all the properties that are illustrated in FIG. 3 and that are required to be displayed. FIG. 5 illustrates, for example, an operation mode, a temperature setting value, an air flow setting, and a wind direction swing setting as properties that are required to be displayed.

(Operation of Operation Terminal)

Hereinafter, an operation of the operation terminal 500 according to the embodiment will be explained. FIG. 6 is a flow diagram illustrating an operation of the operation terminal 500. In the initial state of this flow, the equipment operation screen is not displayed, and, for example, this flow is started upon a trigger when the equipment operation application is activated.

As illustrated in FIG. 6, in step S101, the control unit 550 uses the communication unit 530 to transmit, to the HEMS controller 200, an operation instruction (a Set message or a Get message) for instructing at least one operation included in the operation candidate list. In the embodiment, the control unit 550 transmits a Get message for all the operations included in the operation candidate list (an operation mode, a temperature setting value, an air flow setting, and a wind direction swing setting). Then, the control unit 550 uses the communication unit 530 to obtain a result of the operation instruction (i.e., a response or a negative response to the operation instruction) from the HEMS controller 200.

Alternatively, the control unit 550 may transmit an operation instruction to the operation target equipment 300 without relying on the HEMS controller 200, and may obtain a result of the operation instruction from the operation target equipment 300 without relying on the HEMS controller 200.

In step S102, the control unit 550 identifies an available operation from the operation candidate list on the basis of the result of the operation instruction obtained in step S101. More specifically, an operation corresponding to a negative response is identified as an unavailable operation, and an operation corresponding to a response is identified as an available operation. The control unit 550 displays, on the display unit 510, an operation screen for the operation target equipment 300 on the basis of the identified available operation.

The operation screen is configured to be able to identify an available operation for the operation target equipment 300. More specifically, the operation screen is a first display object associated with the operation available for the operation target equipment 300. In the operation screen, a second display object associated with an operation that is not available with the operation target equipment 300 is excluded. The "display object" is a button selected by a user, a character string indicating the current setting state, and the like. A configuration example of an operation screen will be explained later.

Even after the operation screen is displayed, the control unit 550 preferably tries to update of the operation screen by performing processing of steps S101 and S102 with a regular interval. Because the operation target equipment 300 may return a negative response due to a temporary factor.

In step S103, in a case where the input unit 520 detects user input for selecting a displayed button, the control unit 550 uses the communication unit 530 to transmit an operation instruction for instructing an operation associated with the selected button. The operation instruction is, for example, a Set message.

In step S104, the control unit 550 confirms whether the input unit 520 has detected a user input for selecting an exit button. The exit button may be a button displayed on the display unit 510, or may be a physical button. In a case where a user input for selecting the exit button is not detected (step S104, NO), the control unit 550 returns the processing back to step S103. In contrast, in a case where a user input for selecting the exit button is detected (step S104, YES), the control unit 550 terminates the equipment operation application, and terminates display of the operation screen.

(Operation Screen)

Hereinafter, an operation screen displayed on the display unit 510 will be explained. FIG. 7 is a figure illustrating a configuration example of an operation screen in a case where responses for all the operations of the operation candidate list have been obtained (i.e., in a case where any negative response has not been obtained).

As illustrated in FIG. 7, the operation screen includes a setting display region A1, a temperature setting region A2, and an operation switch region A3. The setting display region A1 includes a character string D1 indicating a temperature that has been set, a character string D2 indicating a operation mode that has been set, and a character string D3 indicating a wind direction swing that has been set. The temperature setting region A2 includes a temperature increase button B21 and a temperature decrease button B21. The operation switch region A3 includes an automatic button B31, a cooling button B32, a heating button B33, a dehumidifying button B34, an air blow button B35, and a swing button B36.

As described above, in a case where the control unit 550 does not obtain any negative response, the control unit 550 generates an operation screen including display objects for all the operations included in the operation candidate list.

FIG. 8 is a figure illustrating a configuration example of an operation screen in a case where a negative response has been obtained for some of the operations of the operation candidate list. In this case, it is assumed that a negative response has been obtained for the wind direction swing setting. In this case, the control unit 550 identifies the operation mode, the temperature setting value, and the air flow setting as the available operations, and identifies the wind direction swing setting as the unavailable operation.

As illustrated in FIG. 8, the control unit 550 excludes a button associated with the unavailable operation (i.e., a swing button B36) from the operation switch region A3. The control unit 550 excludes a character string associated with the unavailable operation (i.e., a character string D3 indicating the wind direction swing) from the setting display region A1.

The control unit 550 may expand the sizes of the non-excluded display objects (the buttons, the character string) by the sizes of the excluded display objects (the buttons, the character string). For example, when the swing button B36 is excluded, a vacant space is generated, and accordingly, the sizes of the other buttons are increased in order to fill the vacant space.

(Summary of the Embodiment)

The operation terminal 500 according to the embodiment includes a display unit 510 displaying an operation screen for the operation target equipment 300, a communication unit 530 for communicating via a network, and a control unit 550 performing control for transmitting at least one operation instruction via the network from the operation candidate list. The control unit 550 controls display objects included in the operation screen on the basis of a result of the operation instruction. Therefore, an appropriate operation screen can be displayed in accordance with the specification, the operation situation, and the like of the equipment. Therefore, this can prevent the user from selecting an unavailable operation for the operation target equipment 300.

In the embodiment, the control unit 550 performs control so as to identify an available operation from the operation candidate list on the basis of the result of the operation instruction, and display the first display object associated with the available operation. Therefore, the user can find available operations for the operation target equipment 300, and can adopt only the available operations for the operation target equipment 300 as the target of selection.

In the embodiment, in a case where the control unit 550 detects a user input for selecting the first display object, the control unit 550 performs control to transmit, via the network, an operation instruction for instructing an operation associated with the selected first display object. Therefore, only an appropriate operation instruction can be configured to be transmittable, so that this can prevent an unexpected error from occurring in the operation target equipment 300 or the HEMS controller 200.

In the embodiment, in the operation screen, the second display object associated with an unavailable operation for the operation target equipment 300 is excluded in the operation candidate list. Therefore, the user cannot select an unavailable operation for the operation target equipment 300, so that this can reliably prevent the user from selecting an unavailable operation for the operation target equipment 300.

In the embodiment, the operation candidate list is constituted by all the operations that are defined for the equipment type to which the operation target equipment 300 belongs and that are required to be displayed. Therefore, an operation candidate list can be set appropriately.

[First Modification]

In the embodiment explained above, in the operation screen, the second display object is excluded. In contrast, in the first modification of the embodiment, the operation screen includes not only the first display object but also the second display object. More specifically, the second display object is not excluded, and is left intentionally on the operation screen.

The second display object is preferably in a display mode that is different from a display mode of the first display object. The display mode is, for example, a color, a size, or the like. Therefore, the user can find not only the available operations but also unavailable operations. Therefore, for example, the specification of the operation target equipment 300 can be estimated.

In the first modification of the embodiment, in a case where the control unit 550 detects a user input for selecting the first display object, the user input is reflected in the first display object. "Reflecting the user input in the first display object" means that the display mode of the first display object is changed and that the operation instruction associated with the first display object is performed.

In a case where the control unit 550 detects a user input for the second display object, the control unit 550 is performed so as not to reflect the user input in the second display object, or so as to display an error. Accordingly, this can prevent this user from selecting an unavailable operation for the operation target equipment 300.

[Second Modification]

In the embodiment explained above, the operation candidate list constituted by all the operations that are defined for the equipment type to which the operation target equipment 300 belongs and that are required to be displayed is stored in the storage unit 540. However, in such configuration, there are many operations which are the target of the try in step S101. Therefore, it is preferable to try to perform the operation upon narrowing down the operations to some extent.

Since the operations are narrowed down, the storage unit 540 stores the operation list table in the second medication of the embodiment. FIG. 9 is a figure illustrating the operation list table according to the second modification of the embodiment.

As illustrated in FIG. 9, the operation list table is table in which specification information about an available operation is associated with an equipment identification code for each of multiple equipments. The multiple equipments belong to the same class as the class to which the operation target equipment 300 belongs.

In a case where the operation target equipment 300 is an air conditioner, the operation list table associates the specification information with an equipment identification code for each of multiple equipments (air conditioners) which belong to the household air conditioner class. FIG. 9 illustrates an example of a case where the operation list table includes specification information of each of "A corporation", "B corporation", "product Y of C corporation", "product X of C corporation", "others".

The equipment identification code includes a manufacturer code indicating the manufacturer of the equipment. The equipment identification code may further include a product code indicating the product name of the equipment. The manufacturers "A corporation", "B corporation", and "C corporation" are identified by manufacturer codes "1111", "2222", "3333", respectively. The product names "Y", "X" are identified by product codes "AAAA", "BBBB", respectively.

The specification information includes at least one of a function supported by the equipment and a setting value supported by the equipment. In a case where the operation target equipment 300 is an air conditioner, the functions supported by the equipment include, for example, supported operation modes (automatic, cooling, heating, dehumidifying, air blow), supported air flow setting modes (whether air flow automation is provided or not), supported wind direction swings (upper and lower directions, right and left directions and, upper, lower, right, and left directions), and the like. The setting values supported by the equipment include, for example, supported temperature setting range, supported air flow level range, and the like.

In the second modification of the embodiment, before performing the try in step S101, the control unit 550 uses the communication unit 530 to obtain the equipment identification code of the operation target equipment 300. The control unit 550 obtains the equipment identification code from the HEMS controller 200 by requesting the HEMS controller 200 to transmit the equipment identification code. Alternatively, the control unit 550 may obtain the equipment identification code from the operation target equipment 300 without relying on the HEMS controller 200 by requesting the operation target equipment 300 to transmit the equipment identification code.

Then, the control unit 550 extracts the specification information associated with the obtained equipment identification code from the operation list table stored in the storage unit 540. The control unit 550 adopts the extracted specification information as the operation candidate list, and performs the try in step S101.

The equipment identification code may include an area code indicating an area where it should be used. The unit of area may be a country (such as Japan, the United States, and the like), or may be a region in the same country (such as Kanto region, Kansai region, and the like). For example, legal regulations and electric power circumstances are different according to countries, and it is expected that there are available functions and unavailable functions. The operation terminal 500 can determine the area where the operation terminal 500 is located from user input or a country code obtained from standby information of a public network (3G and the like). Therefore, an appropriate operation screen for the area where the user is located can be displayed.

[Third Modification]

In the embodiment explained above, in a case where a negative response is obtained in response to the operation instruction, the operation is determined to be unavailable.

However, for example, in a case where an operation is performed to designate a temperature setting value not supported by the operation target equipment 300, the operation target equipment 300 may return a negative response, or may return a response without returning any negative response. In the latter case, the operation target equipment 300 is expected to return a response upon setting a value that is in a range of the temperature setting value supported by the operation target equipment 300 and that is closest to the designated temperature setting value. Therefore, the determination based on only the negative response may be an erroneous determination result.

Therefore, in the third modification of the embodiment, the try in step S101 is performed in two steps.

Firstly, the control unit 550 transmits an operation instruction (Set message) designating a particular temperature setting value, and obtains a response. In a case where a negative response has been obtained, the control unit 550 determines that the operation is unavailable.

Secondly, a Get message is transmitted with regard to the operation for which the response has been obtained, and a response is obtained. Since the response includes a temperature setting value that is actually set with the operation target equipment 300, the range of the temperature setting value supported by the operation target equipment 300 can be estimated through comparison with the temperature setting value designated by the Set message.

[Other Embodiment]

Figure 10:
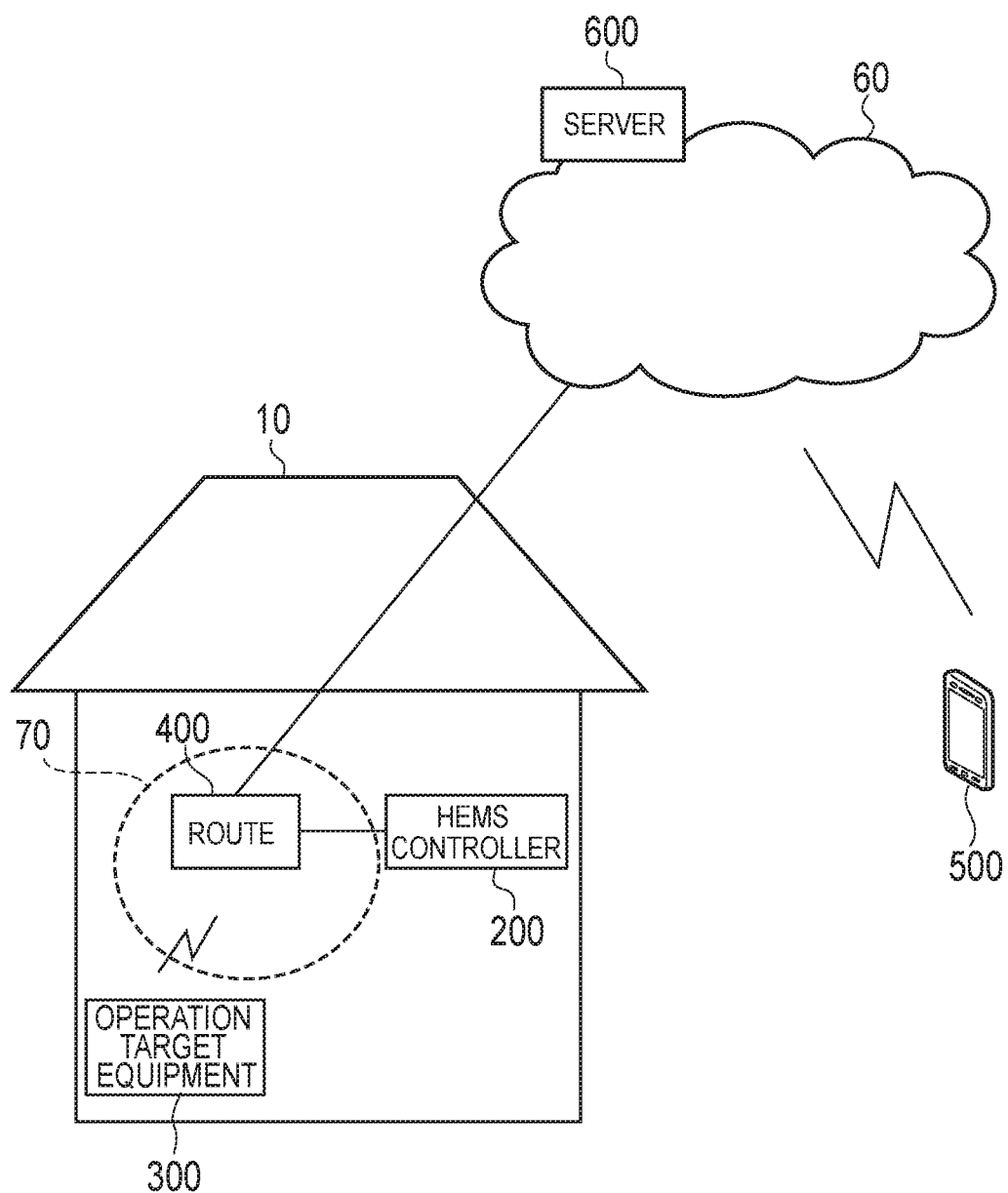
FIG. 10 is a figure illustrating an application scene of a control system according to another embodiment.

In the embodiment explained above, an operation performed via a public network (hereinafter referred to as "remote operation") is not specifically mentioned. However, the present invention can be applied to the remote operation. FIG. 10 is a figure illustrating an application scene of a control system according to another embodiment.

As illustrated in FIG. 10, the router 400 provided in the consumer's facility 10 is connected to the public network 60. The public network 60 is provided with a server 600. The operation terminal 500 is wirelessly connected with the public network 60. However, the operation terminal 500 may be connected with the public network 60 via a wire.

The operation terminal 500 transmits an operation instruction to the server 600 via the public network 60. The server 600 transmits an operation instruction received from the operation terminal 500 via the public network 60 and the local area network 70 to the HEMS controller 200. The HEMS controller 200 transmits an operation instruction received from the server 600 via the local area network 70 to the operation target equipment 300. As described above, the remote operation is an operation performed on the operation target equipment 300 via the public network 60 from the outside of the consumer's facility 10.

In the embodiment explained above, the operation target equipment 300 is an air conditioner which is a type of loads 120. However, the operation target equipment 300 may be a load 120 other than the air conditioner, or may be the storage battery unit 140, and the like.

In the embodiment explained above, for example, the system based on the ECHONET Lite (registered trademark) specification has been shown. However, the embodiment is not limited to the system based on the ECHONET Lite (registered trademark) specification, and, for example, the present invention may be applied to a system based on other communication specifications such as ZigBee (registered trademark) or KNX.

In the embodiment explained above, for example, a case where the control device is the HEMS controller 200 has been shown. However, the control device may be provided in CEMS (Cluster/Community Energy Management System), BEMS (Building Energy Management System), FEMS (Factory Energy Management System), SEMS (Store Energy Management System), or the like.

The entire contents of Japanese Patent Application No. 2013-244579 (filed on Nov. 27, 2013) are incorporated into the specification of the present application by reference.

INDUSTRIAL APPLICABILITY

According to the embodiments, an operation terminal, a program, and a method that can prevent performing an operation inappropriate for an operation target equipment can be provided.

The invention claimed is:

1. An operation terminal operating an operation target equipment, the operation terminal comprising:
a display unit configured to display an operation screen for the operation target equipment;
a communication unit configured to perform communication; and
a control unit configured to
control the communication unit to transmit a plurality of operation instructions from among candidates of available operations for the operation target equipment to the operation target equipment,
receive results of the plurality of transmitted operation instructions from the operation target equipment via the communication unit, wherein each result corresponds to one of the plurality of transmitted operation instructions and indicates whether or not that transmitted operation instruction was accepted by the operation target equipment,
for each of the plurality of operation instructions, identify whether or not the operation instruction is available for the operation target equipment based on the results, and
generate the operation screen to comprise an accepted display object for each of the plurality of operation instructions that corresponded to a result indicating that the transmitted operation instruction was accepted by the operation target equipment, and an unaccepted display object for each of the plurality of operation instructions that corresponded to a result indicating that the transmitted operation instruction was not accepted by the operation target equipment, such that a size of the accepted display objects is different than a size of the unaccepted display objects and only those of the plurality of operation instructions that were accepted by the operation target equipment are selectable from the operation screen by a user.

2. The operation terminal according to claim 1, wherein the control unit is further configured to, in response to a user operation to select a display object corresponding to a selectable operation instruction from the operation screen, transmit, via a network, the selected operation instruction to the operation target equipment.

3. The operation terminal according to claim 2, wherein the control unit is configured to, in response to a user operation to select an unaccepted display object corresponding to an unselectable operation instruction, display an error.

4. The operation terminal according to claim 2, wherein the candidates are operations required to be displayed in all the operations defined for an equipment type to which the operation target equipment belongs.

5. The operation terminal according to claim 2, comprising a storage unit configured to store specification information about an available operation in association with an equipment identification code for each of a plurality of equipments, wherein the control unit obtains an equipment identification code which is information about the operation target equipment via a network, and determines the candidates on the basis of the specification information associated with the obtained equipment identification code.

6. The operation terminal according to claim 1, wherein the control unit is configured to, in response to a user operation to select an unaccepted display object corresponding to an unselectable operation instruction, display an error.

7. The operation terminal according to claim 6, wherein the candidates are operations required to be displayed in all the operations defined for an equipment type to which the operation target equipment belongs.

8. The operation terminal according to claim 6, comprising a storage unit configured to store specification information about an available operation in association with an equipment identification code for each of a plurality of equipments, wherein the control unit obtains an equipment identification code which is information about the operation target equipment via a network, and determines the candidates on the basis of the specification information associated with the obtained equipment identification code.

9. The operation terminal according to claim 1, wherein the candidates are operations required to be displayed in all the operations defined for an equipment type to which the operation target equipment belongs.

10. The operation terminal according to claim 1, comprising a storage unit configured to store specification information about an available operation in association with an equipment identification code for each of a plurality of equipments, wherein the control unit obtains an equipment identification code which is information about the operation target equipment via a network, and determines the candidates on the basis of the specification information associated with the obtained equipment identification code.

11. The operation terminal according to claim 10, wherein each of the plurality of equipments belongs to a same equipment type as an equipment type to which the operation target equipment belongs, and the equipment identification code includes at least one of a manufacturer code indicating a manufacturer of an equipment, a product code indicating a product name of the equipment, and an area code indicating an area where the equipment is to be used.

12. A non-transitory computer-readable storage medium storing a program for an operation terminal including a display unit displaying an operation screen for an operation target equipment and a communication unit performing communication, and operating the operation target equipment, the program causing the operation terminal to:
control the communication unit to transmit a plurality of operation instructions from among candidates of available operations for the operation target equipment to the operation target equipment;
receive results of the plurality of transmitted operation instructions from the operation target equipment via the communication unit, wherein each result corresponds to one of the plurality of transmitted operation instructions and indicates whether or not that transmitted operation instruction was accepted by the operation target equipment;
for each of the plurality of operation instructions, identify whether or not the operation instruction is available for the operation target equipment based on the results; and
generate the operation screen to comprise an accepted display object for each of the plurality of operation instructions that corresponded to a result indicating that the transmitted operation instruction was accepted by the operation target equipment, and an unaccepted display object for each of the plurality of operation instructions that corresponded to a result indicating that the transmitted operation instruction was not accepted by the operation target equipment, such that a size of the accepted display objects is different than a size of the unaccepted display objects and only those of the plurality of operation instructions that were accepted by the operation target equipment are selectable from the operation screen by a user.

13. A method used in an operation terminal including a display unit displaying an operation screen for the operation target equipment and a communication unit performing communication, and operating the operation target equipment, the method comprising:
controlling the communication unit to transmit a plurality of operation instructions from among candidates of available operations for the operation target equipment to the operation target equipment;
receiving results of the plurality of transmitted operation instructions from the operation target equipment via the communication unit, wherein each result corresponds to one of the plurality of transmitted operation instructions and indicates whether or not that transmitted operation instruction was accepted by the operation target equipment;
for each of the plurality of operation instructions, identify whether or not the operation instruction is available for the operation target equipment based on the results; and
generating the operation screen to comprise an accepted display object for each of the plurality of operation instructions that corresponded to a result indicating that the transmitted operation instruction was accepted by the operation target equipment, and an unaccepted display object for each of the plurality of operation instructions that corresponded to a result indicating that the transmitted operation instruction was not accepted by the operation target equipment, such that a size of the accepted display objects is different than a size of the unaccepted display objects and only those of the plurality of operation instructions that were accepted by the operation target equipment are selectable from the operation screen by a user.

* * * * *